United States Patent [19]
Tajima

[11] Patent Number: 5,926,304
[45] Date of Patent: Jul. 20, 1999

[54] OPTICAL FIBER AMP REPEATER OF AMPLIFYING AN OPTICAL SIGNAL AND SUPERIMPOSING AN AUXILIARY SIGNAL

[75] Inventor: Tsutomu Tajima, Tokyo, Japan

[73] Assignee: NEC Corporation, Tokyo, Japan

[21] Appl. No.: 08/814,870

[22] Filed: Mar. 11, 1997

[30] Foreign Application Priority Data

Mar. 15, 1996 [JP] Japan .................................. 8-087639

[51] Int. Cl.⁶ .................................................. H04B 10/08
[52] U.S. Cl. ............................ 359/174; 359/177; 359/341
[58] Field of Search ..................................... 359/174, 175, 359/176, 177, 179, 110, 341, 333, 160

[56] References Cited

U.S. PATENT DOCUMENTS

| | | | |
|---|---|---|---|
| 5,383,046 | 1/1995 | Tomofugi et al. | 359/176 |
| 5,440,418 | 8/1995 | Ishimura et al. | 359/177 |
| 5,535,037 | 7/1996 | Yoneyama | 359/177 |
| 5,625,481 | 4/1997 | Tamura et al. | 359/175 |
| 5,703,711 | 12/1997 | Hamada | 359/177 |

FOREIGN PATENT DOCUMENTS

| | | |
|---|---|---|
| 3258038 | 11/1991 | Japan . |
| 43028 | 1/1992 | Japan . |
| 4306928 | 10/1992 | Japan . |
| 4-314223 | 11/1992 | Japan . |
| 5-316049 | 11/1993 | Japan . |

Primary Examiner—Rafael Bacares
Attorney, Agent, or Firm—Whitham, Curtis & Whitham

[57] ABSTRACT

An optical fiber amp repeater, provided on an optical transmission channel in an optical system, having an excitation light output section for supplying an excitation light for amplifying a received optical signal, and a main signal light amplifier section for supplying the optical signal which is amplified while going through the rare earth dope fiber after combining the received optical signal with the excitation light supplied from the excitation light output section, the excitation light output section including an excitation light source for transmitting the excitation light and an excitation light source driving circuit for driving the excitation light source, the excitation light source driving circuit controlling the excitation light source according to a given data and modulating the excitation light by high frequency wave, thereby to create an auxiliary signal containing the given data.

12 Claims, 2 Drawing Sheets

OPTICAL FIBER AMP REPEATER OF AMPLIFYING AN OPTICAL SIGNAL AND SUPERIMPOSING AN AUXILIARY SIGNAL

BACKGROUNDS OF THE INVENTION

1. Field of the Invention

The present invention relates to an optical fiber amp repeater, provided on an optical channel, for amplifying an optical signal in an optical transmission system, and more particularly to an optical fiber amp repeater that transmits signals with an auxiliary signal superimposed on a main signal for the purpose of the maintenance of the optical transmission system.

2. Description of the Related Art

In an optical transmission system, an auxiliary signal is superimposed on a main signal, for the purpose of maintenance, in order to recognize a fault location on the optical channel or to discriminate a fault optical fiber amp repeater. The auxiliary signal is superimposed on the main signal in the optical fiber amp repeater provided on the optical channel. The auxiliary signal includes monitoring information for monitoring the operating state of a terminal unit or an optical fiber amp repeater.

An example of conventional optical fiber amp repeaters of this kind, in which an auxiliary signal is superimposed on a main signal, has shown that the auxiliary signal having wavelength different from the main signal is multiplexed by the wavelength multiplex transmission technique for the data transmission. The conventional optical fiber amp repeater comprises a wavelength multiplex coupler for separating a multiplexed optical signal and composing an optical signal, an optical-to-electrical transducer for converting an optical signal into an electrical signal, and an electrical-to-optical transducer for converting an electrical signal into an optical signal. The repeater takes out the auxiliary signal superimposed on the main signal from input signals, converts it into an electrical signal for processing, further converts it into an optical signal, so as to be combined with the main signal, and sends it to the transmission channel again, thereby transmitting the auxiliary signal.

An example of the conventional technique of this kind is disclosed in Japanese Patent Publication Laid-Open (Kokai) No. Heisei 3-258038, "A Monitoring Method of an Optical Fiber Transmission Channel". This publication describes an optical fiber amp repeater comprising a means for receiving an optical signal modulated by a main signal and reproducing the main signal, a means for obtaining monitoring information out of the reproduced main signal, and a means for generating an optical signal modulated by the different wavelength from the main signal according to the obtained monitoring information, the repeater transmitting the generated optical signal through an optical transmission channel.

Another example of the conventional technique of this kind is disclosed in Japanese Patent Publication Laid-Open (Kokai) No. Heisei 4-306928, "An Optical Repeater and a Monitoring System of an Optical Channel by the Use of the Repeater". This publication discloses an optical fiber amp repeater in which, of the excitation light entered into a rare earth dope optical fiber from an excitation light source through a wavelength multiplex optical coupler, the remaining excitation light after going through the rare earth dope optical fiber is separated by means of the wavelength multiplex optical coupler so to enter one into a light excitation laser, thereby to generate a monitoring signal light having the wavelength different from that of the main signal light within the gain-wavelength of a rare earth dope optical fiber and combine the monitoring signal light with the main signal light having been amplified by an optical coupler to provide.

Another example of the conventional optical fiber amp repeater has shown the optical repeater that superimposes an auxiliary signal on the envelope of the peak value of the main signal by modulating the excitation light source by the auxiliary signal. Japanese Patent Publication Laid-Open (Kokai) No. Heisei 4-3028, "An Optical Repeater" discloses the conventional technique of this kind. It describes an optical fiber amp repeater comprising an oscillator for modulating bias current of a pump light source in an optical fiber amplifier by low frequency wave, an optical wave combining device connected to the output of the optical fiber amplifier, an optical detector for detecting a part of output optical signal of the optical wave combining device to convert into an electrical signal, a band-pass filter permitting the signal having the frequency similar to the output frequency of the oscillator, of the output signals from the optical detector, and an automatically gain control circuit for controlling the gain of the optical fiber amplifier so that it may be constant by adjusting the bias current of the pump light source according to the output signal of the band-pass filter.

The above-mentioned optical fiber amp repeater, however, has the following problems. The first example of the conventional technique, in which the optical repeater is operated with an auxiliary signal converted into an electrical signal, may be realized by an optical fiber amp repeater of a simple structure. However, it requires an optical-to-electrical conversion circuit in order to convert an auxiliary signal into an electrical signal for the processing, as well as an electrical-to-optical conversion circuit in order to further convert the processed electrical signal into an optical signal for the transmission, thereby increasing the manufacturing cost.

The second example of the conventional technique, in which the excitation light source is modulated by the auxiliary signal, has to modulate the excitation light source by low frequency wave according to the characteristic of the optical fiber amp repeater, thereby resulting in restricting the capacity of transmitting the auxiliary signal.

Further, the above second example of the conventional technique varies the output level of the main signal to a degree because an auxiliary signal is superimposed on the envelope of the peak value of the main signal, thereby resulting in spoiling the original function of amplifying the main signal in some degree.

SUMMARY OF THE INVENTION

In order to solve the above conventional problems, an object of the present invention is to provide an optical fiber amp repeater having a simple structure so to reduce the manufacturing cost, free from any influence upon the main signal's amplification because of the auxiliary signal superimposed thereon, and further capable of increasing the capacity of transmitting an auxiliary signal.

According to one aspect of the invention, an optical fiber amp repeater, provided on an optical transmission channel in an optical transmission system, comprises an excitation light output means for supplying an excitation light for amplifying a received optical signal; and an optical signal amplifier means for supplying the optical signal which is amplified while going through a rare earth dope fiber after combining the received optical signal with the excitation light supplied by the excitation light output means;

wherein the excitation light output means comprises an excitation light source for sending an excitation light, and a driving control means for driving the excitation light source, the driving control means controlling the excitation light source according to a given data and modulating the excitation light by high frequency wave, thereby to create an auxiliary signal containing the given data.

In the preferred construction, the optical fiber amp repeater further comprises an auxiliary signal light combining means for combining the excitation light containing the auxiliary signal obtained by the high frequency wave with the optical signal, wherein the high frequency wave for modulating the excitation light in order to create the auxiliary signal under the driving control of the driving control means, holds the frequency beyond the adjusting speed for output level of the optical signal amplifier means.

In the preferred construction, the high frequency wave for modulating the excitation light in order to create the auxiliary signal under the driving control of the driving control means, holds the frequency beyond the adjusting speed for output level of the optical signal amplifier means, the excitation light output means comprises an excitation light distributing means for dividing the excitation light and delivering one of the divided excitation light to the optical signal amplifier means, wherein further comprises an auxiliary signal light combining means for combining the other excitation light which is not delivered to the optical signal amplifier means, of the excitation light divided by the excitation light distributing means of the excitation light output means, with the optical signal sent from the optical signal amplifier means, as an auxiliary signal light for transmitting the auxiliary signal.

In another preferred construction, the optical fiber amp repeater further comprises an optical signal separating means for separating the received optical signal between a main signal light for transmitting a main signal and the auxiliary signal light for transmitting the auxiliary signal; and an auxiliary signal extracting means for converting into an electrical signal the auxiliary signal light separated from the optical signal by the optical signal separating means;

wherein the data for use in the driving control to the excitation light source by the driving control means contains the content of the auxiliary signal extracted from the received optical signal by the auxiliary signal extracting means.

In another preferred construction, the optical fiber amp repeater further comprises an auxiliary signal light combining means for combining the excitation light containing the auxiliary signal obtained by the high frequency wave with the optical signal;

an optical signal separating means for separating the received optical signal between the main signal light for transmitting the main signal and the auxiliary signal light for transmitting the auxiliary signal; and an auxiliary signal extracting means for converting into an electrical signal the auxiliary signal light separated from the optical signal by the optical signal separating means;

wherein the high frequency wave for modulating the excitation light in order to create the auxiliary signal under the driving control of the driving control means, holds the frequency beyond the adjusting speed for output level of the optical signal amplifier means, and the data for use in the driving control to the excitation light source by the driving control means contains the content of the auxiliary signal extracted from the received optical signal by the auxiliary signal extracting means.

Also, the optical fiber amp repeater further comprises the excitation light output means comprises the excitation light distributing means for dividing the excitation light and delivering one of the divided excitation light to the optical signal amplifier means, wherein further comprising an auxiliary signal light combining means for combining the other excitation light which is not delivered to the optical signal amplifier means, of the excitation light divided by the excitation light distributing means of the excitation light output means, with the optical signal sent from the optical signal amplifier means, as the auxiliary signal light for transmitting the auxiliary signal;

an optical signal separating means for separating the received optical signal between the main signal light for transmitting the main signal and the auxiliary signal light for transmitting the auxiliary signal, and an auxiliary signal extracting means for converting into an electrical signal the auxiliary signal light separated from the optical signal by the optical signal separating means, wherein the high frequency wave for modulating the excitation light in order to create the auxiliary signal under the driving control of the driving control means, holds the frequency beyond the adjusting speed for output level of the optical signal amplifier means, and the data for use in the driving control to the excitation light source by the driving control means contains the content of the auxiliary signal extracted from the received optical signal by the auxiliary signal extracting means.

According to another aspect of the invention, an optical fiber amp repeater, provided on an optical transmission channel in an optical transmission system, comprises an excitation light output means for supplying an excitation light for amplifying a received optical signal;

an optical signal amplifier means for supplying the optical signal which is amplified while going through a rare earth dope fiber after combining the received optical signal with the excitation light supplied by the excitation light output means;

an optical signal separating means for separating the received optical signal between a main signal light for transmitting a main signal and an auxiliary signal light for transmitting an auxiliary signal; and an auxiliary signal extracting means for converting into an electrical signal the auxiliary signal light separated from the optical signal by the optical signal separating means;

the excitation light output means comprising an excitation light source for sending an excitation light, a driving control means for driving the excitation light source, and an excitation light distributing means for dividing the excitation light and delivering one of the divided excitation light to the optical signal amplifier means, wherein further comprising an auxiliary signal light combining means is further provided, for combining the other excitation light which is not delivered to the optical signal amplifier means, of the excitation light divided by the excitation light distributing means of the excitation light output means, with the optical signal sent from the optical signal amplifier means, as the auxiliary signal light for transmitting the auxiliary signal, the driving control means controls the excitation light source according to a given data containing the content of the auxiliary signal extracted from the received optical signal by the auxiliary signal extracting means and modulates the excitation light by high frequency wave, thereby to create the auxiliary signal containing the given data.

In the preferred construction, the high frequency wave for modulating the excitation light in order to create the auxiliary signal under the driving control of the driving control means, holds the frequency beyond the adjusting speed for output level of the optical signal amplifier means.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
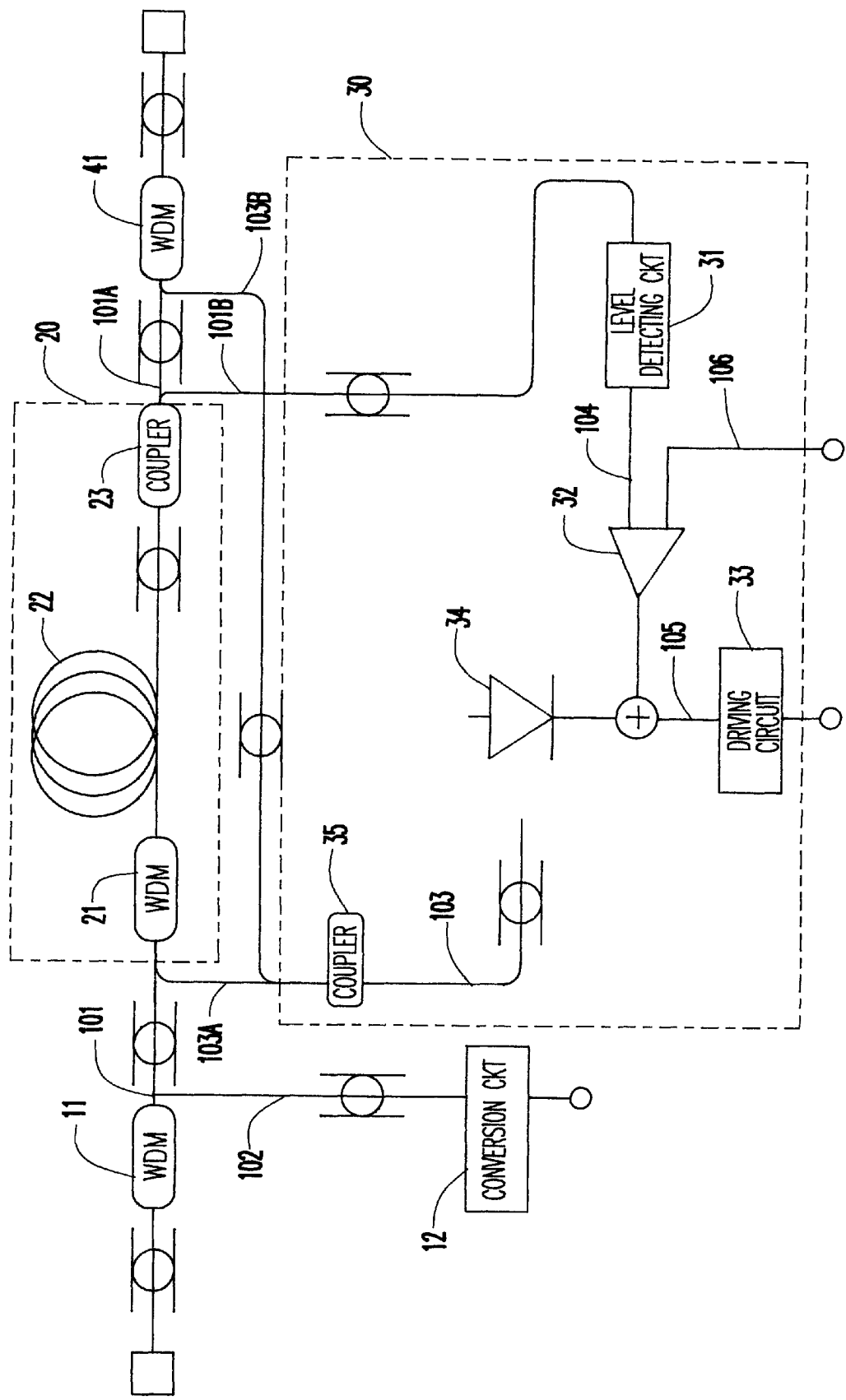
FIG. 1 is a block diagram showing a constitution of an optical fiber amp repeater according to an embodiment of the present invention.

FIG. 1 is a block diagram showing a constitution of an optical fiber amp repeater according to an embodiment of the present invention.

As illustrated in FIG. 1, the optical fiber amp repeater of the embodiment comprises a wavelength division multiplex/demultiplex coupler (hereinafter, referred to as a WDM coupler) 11 for separating a received optical signal between a main signal light 101 and an auxiliary signal light 102, an optical-to-electrical conversion circuit 12 for converting the separated auxiliary signal light 102 into an electrical signal, a main signal light amplifier section 20 for amplifying the separated main signal light 101, an excitation light output section 30 for supplying an excitation light 103 used for the amplification of the main signal 101 and containing the auxiliary signal, and a WDM coupler 41 for supplying signals with the auxiliary signal contained in the excitation light 103 superimposed on the main signal transmitted by the main signal light 101 amplified by the excitation light 103. The main signal light amplifier section 20 includes a WDM coupler 21 for combining the main signal light 101 and the excitation light 103, a rare earth dope fiber 22 and an optical coupler 23 for distributing the main signal light 101 amplified while going through the rare earth dope fiber 22 to the WDM coupler 41 and the excitation light output section 30. The excitation light output section 30 includes an output level detecting circuit 31 for monitoring the main signal light 101 amplified by the excitation light 103, an excitation light source 34, a negative feedback circuit 32 for controlling the excitation light source 34 according to the detecting result of the output level detecting circuit 31, an excitation light source driving circuit 33 for driving the excitation light source 34 to create an auxiliary signal, and an optical coupler 35 for distributing the excitation light 103 supplied from the excitation light source 34 to the main signal light amplifier section 20 and the WDM coupler 41.

In FIG. 1, only the characteristic constitution of the embodiment is described, while the description of the other general constitution is omitted therefrom. It is needless to say that the device actually includes some processors for processing the auxiliary signal separated from the received optical signal and for creating information on the optical fiber amp repeater, which is described on the auxiliary signal sent from the optical fiber amp repeater. A plurality of optical fiber amp repeaters according to the embodiment are provided on the optical transmission channel on several phases.

The WDM coupler 11, upon receipt of an optical signal sent from a terminal unit, or sent via an optical fiber amp repeater at the upstream portion on the optical transmission channel, separates it between the main signal light 101 for transmitting a main signal including the data to be transmitted and the auxiliary signal light 102 superimposed on the main signal light 101 for detecting a fault of a device, an optical fiber, and an optical signal.

The optical-to-electrical conversion circuit 12 is realized by the use of an optical-to-electrical conversion element such as photodiode or the like. The circuit 12 receives the auxiliary signal 102 obtained by the WDM coupler 11 separating an optical signal and converts it into an electrical signal. The auxiliary signal of the converted electrical signal is processed depending on the necessity and used for monitoring the state of an upstream optical fiber amp repeater on the optical transmission channel and the optical fiber.

The WDM coupler 21 of the main signal light amplifier section 20 combines the main signal light 101 obtained by the WDM coupler 11 separating the optical signal with the excitation light 103a supplied from the excitation light output section 30, then leading it to the rare earth dope fiber 22, that is, an optical fiber with the rare earth (for example, erbium) added thereto. The main signal light 101 combined with the excitation light 103a is amplified while going through the rare earth dope fiber 22.

The optical coupler 23 divides the optical signal amplified while going through the rare earth dope fiber 22, between a sending signal light 101a to be sent from the present optical fiber amp repeater and a monitoring signal light 101b to be used in the present optical fiber amp repeater, and distributes them to each destination. The sending signal light 101a and the monitoring signal light 101b are identical optical signal. The distributed monitoring signal light 101b is used to adjust the excitation light.

The output level detecting circuit 31 of the excitation light output section 30 is realized by the use of an optical-to-electrical conversion element, such as photodiode or the like, and a resister. The circuit 31 receives the monitoring signal light 101b sent from the optical coupler 23 to convert into an electrical signal. As a result, a monitor voltage signal 104, that is for detecting the intensity of the monitoring signal light 101b as voltage, can be obtained.

The negative feedback circuit 32 is realized by the use of, for example, a comparator, and makes a comparison between the monitor voltage signal 104 supplied from the output level detecting circuit 31 and a predetermined reference voltage signal 106 for adjusting the output level. The circuit 32 controls the excitation light source 34 with the negative feedback processing so that the difference between the monitor voltage 104 and the reference voltage may become as small as possible. More specifically, when the monitor voltage 104 is smaller than the reference voltage, the circuit 32 intensifies the excitation light power 105 supplied from the excitation light source driving circuit 33 to the excitation light source 34, so to make larger the output level of the output light (excitation light 103) from the excitation light source 34. When the monitor voltage 104 is larger than the reference voltage, the circuit 32 weakens the excitation light power 105, so to lessen the output level of the output light (excitation light 103) from the excitation light source 34.

The excitation light source driving circuit 33 is realized by the use of, for example, a CPU controlled by a program. It drives and controls the excitation light source 34 according to a given input data. Thus, the excitation light 103 supplied from the excitation light source 34 is modulated, and the auxiliary signal can be created. The data entered in the excitation light source driving circuit 33 is the information to be sent as the auxiliary signal, in other words, the information including the content of the auxiliary signal sent from each device located more upstream optical fire sent optical fiber amp repeater as well as the information on the present optical fiber amp repeater.

At least the same number of frames as that of the optical fiber amp repeaters provided on the optical transmission channel is prepared for the auxiliary signal, each frame corresponding to each optical fiber amp repeater. When the main signal light is amplified in each optical fiber amp repeater, the information on the present optical fiber amp repeater is described in the frame corresponding to the same repeater. Therefore, a fault on the optical transmission channel could be easily specified by analyzing the auxiliary signal in every frame.

Figure 2:
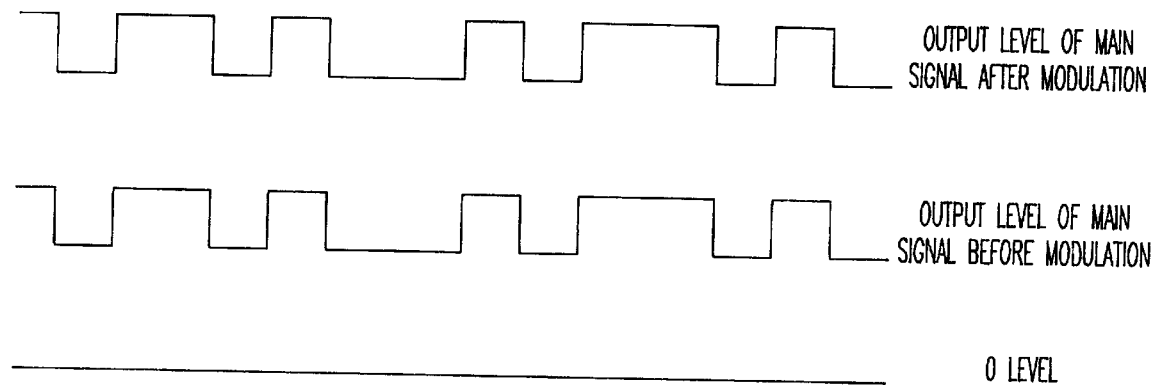
FIG. 2 is a wave shape view showing characteristic change in the output level of a main signal according to the control of the embodiment.

The excitation light source driving circuit 33 creates an auxiliary signal by modulating the excitation light supplied from the excitation light source 34 by high frequency wave (several megabits per second). Therefore, a larger amount of information can be written in the auxiliary signal than the conventional technique in which an auxiliary signal obtained by modulating the excitation light by low frequency wave (several kilobits per second) is superimposed on the envelope of the peak value of the main signal light. The optical output level is not affected by the speed of modulating the excitation light because it is modulated by the high frequency wave, when amplifying the main signal light by the use of the excitation light. Therefore, amplification result similar to the direct current level can be obtained as illustrated in FIG. 2. In other words, the auxiliary signal contained in the excitation light will not affect the output level of the main signal light.

The excitation light source 34 is realized by the use of, for example, a laser diode. It supplies the excitation light 103 at the output level corresponding to the excitation light power compensated by the negative feedback circuit 32 according to the driving control of the excitation light source driving circuit 33. Therefore, the excitation light 103 supplied from the excitation light source 34 is to contain the auxiliary signal by the modulation, holding a constant output level for amplifying the main signal light.

The output coupler 35 divides the excitation light 103 supplied from the excitation light source 34 into two. One is sent to the WDM coupler 21 as the excitation light 103a for amplifying the main signal light 101 so as to be combined with the main signal light 101, and another is sent to the WDM coupler 41 as the auxiliary signal light 103b for transmitting the auxiliary signal so as to be combined with the signal light 101a supplied from the optical coupler 23.

The WDM coupler 41 combines the signal light 101a supplied from the optical coupler 23 with the auxiliary signal light (excitation light) 103b supplied from the optical coupler 35, and delivers it to the optical transmission channel. Thus, the main signal and the auxiliary signal are superimposed on each other.

Although the present invention has been, hereinabove, described with the preferred embodiment, it is not necessarily restricted to the above embodiment. For example, an auxiliary signal may include a sound signal or a control signal in addition to the monitor signal for monitoring the state of the terminal unit and the optical fiber amp repeater. The value of the high frequency wave for modulating the excitation light may vary selectively within the range in which it doesn't affect the output level of the main signal going through the rare earth dope fiber.

As set forth hereinabove, since an optical fiber amp repeater of the embodiment is constituted in that an excitation light for amplifying a main signal light is modulated, so to create an auxiliary signal, the excitation light source driving circuit and excitation light source for supplying an excitation light is also served as an electrical-to-optical conversion circuit for changing the auxiliary signal from an electrical signal to an optical one. Therefore, it is not necessary to provide with the electrical-to-optical conversion circuit as a separate component, which makes it possible to reduce the manufacturing cost of the optical fiber amp repeater.

Further, since an auxiliary signal is created by modulating the excitation light by high frequency wave, a larger amount of information can be written in the auxiliary signal for a predetermined period, thereby to increase the capacity of transmitting the auxiliary signal.

Additionally, since the auxiliary signal is created by modulating the excitation light by high frequency wave, amplifying a main signal by the excitation light for use in the auxiliary signal, which is superimposed on the main signal, doesn't affect the output level of the main signal by the auxiliary signal. Therefore, it has an advantage that the original function of an optical fiber amp repeater, that is, amplification of a main signal is not spoiled by the present invention.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An optical fiber amp repeater, provided on an optical transmission channel in an optical transmission system, comprising:

an excitation light output means for supplying an excitation light for amplifying a received optical signal; and an optical signal amplifier means for supplying an optical signal, the optical signal formed by combining the received optical signal with the excitation light supplied by said excitation light output means and then amplifying the combined signal by passing the combined signal through a rare earth dope fiber;

wherein said excitation light output means comprises an excitation light source for sending an excitation light and a driving control means for driving said excitation light source, said driving control means controlling said excitation light source according to a given data and modulating the excitation light, to thereby create an auxiliary signal containing the given data, wherein said optical fiber amp repeater further includes a comparator for comparing an intensity of light output from said optical signal amplifier means with a predetermined reference voltage signal, an output power level of said driving control means being adjusted based on a result of said comparator.

2. An optical fiber amp repeater, provided on an optical transmission channel in an optical transmission system, comprising:

an excitation light output means for supplying an excitation light for amplifying a received optical signal; and an optical signal amplifier means for supplying an optical signal which is amplified while going through a rare earth dope fiber after combining the received optical signal with the excitation light supplied by said excitation light output means;

wherein said excitation light output means comprises an excitation light source for sending an excitation light, and a driving control means for driving said excitation light source, said driving control means controlling said excitation light source according to a given data and modulating the excitation light, to thereby create an auxiliary signal containing the given data, wherein the high frequency wave for modulating the excitation light in order to create the auxiliary signal under the driving control of said driving control means, holds the frequency beyond the adjusting speed for output level of said optical signal amplifier means, said excitation light output means comprises an excitation light distributing means for dividing the excitation light and delivering one of the divided excitation light to said optical signal amplifier means, and further comprising an auxiliary signal light combining means for combining the other excitation light which is not delivered to said optical signal amplifier means, of the excitation light divided by said excitation light distributing means of said excitation light output means, with the optical signal sent from said optical signal amplifier means, as an auxiliary signal light for transmitting the auxiliary signal.

3. An optical fiber amp repeater as set forth in claim 2, further comprising an auxiliary signal light combining means for combining the excitation light containing the auxiliary signal obtained by the high frequency wave with the optical signal, wherein the high frequency wave for modulating the excitation light in order to create the auxiliary signal under the driving control of said driving control means, holds the frequency beyond the adjusting speed for output level of said optical signal amplifier means.

4. An optical fiber amp repeater as set forth in claim 2, further comprising:

an optical signal separating means for separating the received optical signal between a main signal light for transmitting a main signal and the auxiliary signal light for transmitting the auxiliary signal; and an auxiliary signal extracting means for converting into an electrical signal the auxiliary signal light separated from the optical signal by said optical signal separating means;

wherein the data for use in the driving control to said excitation light source by said driving control means contains a content of the auxiliary signal extracted from the received optical signal by said auxiliary signal extracting means.

5. An optical fiber amp repeater, provided on an optical transmission channel in an optical transmission system, comprising:

an excitation light output means for supplying an excitation light for amplifying a received optical signal; and an optical signal amplifier means for supplying an optical signal which is amplified while going through a rare earth dope fiber after combining the received optical signal with the excitation light supplied by said excitation light output means;

wherein said excitation light output means comprises an excitation light source for sending an excitation light, and a driving control means for driving said excitation light source, said driving control means controlling said excitation light source according to a given data and modulating the excitation light, to thereby create an auxiliary signal containing the given data, said optical fiber amp repeater further comprising:

an auxiliary signal light combining means for combining the excitation light containing the auxiliary signal obtained by the high frequency wave with the optical signal;

an optical signal separating means for separating the received optical signal between the main signal light for transmitting the main signal and the auxiliary signal light for transmitting the auxiliary signal; and an auxiliary signal extracting means for converting into an electrical signal the auxiliary signal light separated from the optical signal by said optical signal separating means;

wherein the high frequency wave for modulating the excitation light in order to create he auxiliary signal under the driving control of said driving control means, holds the frequency beyond the adjusting speed for output level of said optical signal amplifier means, and wherein the data for use in the driving control to said excitation light source by said driving control means contains the content of the auxiliary signal extracted from the received optical signal by said auxiliary signal extracting means.

6. An optical fiber amp repeater, provided on an optical transmission channel in an optical transmission system, comprising:

an excitation light output means for supplying an excitation light for amplifying a received optical signal; and an optical signal amplifier means for supplying an optical signal which is amplified while going through a rare earth dope fiber after combining the received optical signal with the excitation light supplied by said excitation light output means;

wherein said excitation light output means comprises an excitation light source for sending an excitation light, and a driving control means for driving said excitation light source, said driving control means controlling said excitation light source according to a given data and modulating the excitation light, to thereby create an auxiliary signal containing the given data, wherein said excitation light output means comprises an excitation light distributing means for dividing the excitation light and delivering one of the divided excitation light to said optical signal amplifier means, said optical fiber amp repeater further comprising an auxiliary signal light combining means for combining the other excitation light which is not delivered to said optical signal amplifier means, of the excitation light divided by said excitation light distributing means of said excitation light output means, with the optical signal sent from said optical signal amplifier means, as the auxiliary signal light for transmitting the auxiliary signal;

an optical signal separating means for separating the received optical signal between the main signal light for transmitting the main signal and the auxiliary signal light for transmitting the auxiliary signal, and an auxiliary signal extracting means for converting into an electrical signal the auxiliary signal light separated from the optical signal by said optical signal separating means, wherein the high frequency wave for modulating the excitation light in order to create he auxiliary signal under the driving control of said driving control means, holds the frequency beyond the adjusting speed for output level of said optical signal amplifier means, and wherein the data for use in the driving control to said excitation light source by said driving control means contains the content of the auxiliary signal extracted from the receive optical signal by said auxiliary signal extracting means.

7. An optical fiber amp repeater, provided on an optical transmission channel in an optical transmission system, comprising:

an excitation light output means for supplying an excitation light for amplifying a received optical signal;

an optical signal amplifier means for supplying the optical signal which is amplified while going through a rare earth dope fiber after combining the received optical signal with the excitation light supplied by said excitation light output means;

an optical signal separating means for separating the received optical signal between a main signal light for transmitting a main signal and an auxiliary signal light for transmitting an auxiliary signal; and an auxiliary signal extracting means for converting into an electrical signal the auxiliary signal light separated from the optical signal by said optical signal separating means;

said excitation light output means comprising an excitation light source for sending an excitation light, a driving control means for driving said excitation light source, and an excitation light distributing means for dividing the excitation light and delivering one of the divided excitation light to said optical signal amplifier means, wherein further comprising an auxiliary signal light combining means is further provided, for combining the other excitation light which is not delivered to said optical signal amplifier means, of the excitation light divided by said excitation light distributing means of said excitation light output means, with the optical signal sent from said optical signal amplifier means, as the auxiliary signal light for transmitting the auxiliary signal, said driving control means controls said excitation light source according to a given data containing the content of the auxiliary signal extracted from the received optical signal by said auxiliary signal extracting means and modulates the excitation light by high frequency wave, thereby to create the auxiliary signal containing the given data.

8. An optical fiber amp repeater as set forth in claim 7, wherein the high frequency wave for modulating the excitation light in order to create the auxiliary signal under the driving control of said driving control means, holds the frequency beyond the adjusting speed for output level of said optical signal amplifier means.

9. An optical fiber amp repeater as set forth in claim 1, wherein said driving control means modulates the excitation light by a high frequency wave which corresponds to values lying in a range of megabits per second.

10. An optical fiber amp repeater as set forth in claim 2, wherein said driving control means modulates the excitation light by a high frequency wave which corresponds to values lying in a range of megabits per second.

11. An optical fiber amp repeater as set forth in claim 5, wherein said driving control means modulates the excitation light by a high frequency wave which corresponds to values lying in a range of megabits per second.

12. An optical fiber amp repeater as set forth in claim 6, wherein said driving control means modulates the excitation light by a high frequency wave which corresponds to values lying in a range of megabits per second.

* * * * *